United States Patent
Lieu et al.

(10) Patent No.: US 7,067,944 B2
(45) Date of Patent: *Jun. 27, 2006

(54) MOTOR WITH ENCAPSULATED STATOR AND METHOD OF MAKING SAME

(75) Inventors: Dennis K. Lieu, Moraga, CA (US); Griffith D. Neal, Alameda, CA (US)

(73) Assignee: Encap Motor Corporation, Alameda, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/035,906

(22) Filed: Jan. 14, 2005

(65) Prior Publication Data

US 2005/0134124 A1 Jun. 23, 2005

Related U.S. Application Data

(62) Division of application No. 09/738,268, filed on Dec. 15, 2000, now Pat. No. 6,844,636.

(60) Provisional application No. 60/171,817, filed on Dec. 21, 1999, provisional application No. 60/172,287, filed on Dec. 17, 1999.

(51) Int. Cl.
  *H02K 1/04* (2006.01)
(52) U.S. Cl. .......................................... 310/43; 29/596
(58) Field of Classification Search ..................... None
  See application file for complete search history.

(56) References Cited

U.S. PATENT DOCUMENTS

| 3,590,328 A | 6/1971 | Frescura |
| 3,638,055 A | 1/1972 | Zimmermann |
| 3,874,073 A | 4/1975 | Dochterman et al. |
| 3,942,054 A | 3/1976 | Kristen et al. |
| 3,979,530 A | 9/1976 | Schwider et al. |
| 4,128,527 A | 12/1978 | Kinjo et al. |
| 4,352,897 A | 10/1982 | Ogata et al. |
| 4,387,311 A | 6/1983 | Kobayashi et al. |
| 4,390,649 A * | 6/1983 | Aharoni ...................... 524/167 |
| 4,492,889 A | 1/1985 | Fukushi et al. |
| 4,572,979 A | 2/1986 | Haar et al. |
| 4,679,313 A | 7/1987 | Schultz et al. |
| 4,760,299 A | 7/1988 | Dickie et al. |
| 4,801,833 A | 1/1989 | Dye |
| 4,853,576 A | 8/1989 | Mayumi et al. |
| 4,855,853 A | 8/1989 | Matsushita et al. |
| 4,858,073 A | 8/1989 | Gregory |
| 4,868,970 A | 9/1989 | Schultz et al. |

(Continued)

FOREIGN PATENT DOCUMENTS

BE     870.878     1/1979

(Continued)

OTHER PUBLICATIONS

LNP Engineering Plastics, Advertisement entitled "Konduit™ Thermally Conductive Composites," undated (2 pages).

(Continued)

*Primary Examiner*—Joseph Waks
(74) *Attorney, Agent, or Firm*—Steven P. Shurtz; Brinks Hofer Gilson & Lione

(57) ABSTRACT

A motor comprises a baseplate, a shaft supported by said baseplate, a stator assembly having windings, the stator being rigidly attached to said baseplate, and injection molded thermoplastic material encapsulating said windings. In one embodiment, the stator is coreless. In other embodiments, the stator has a core and the core is substantially encapsulated by the thermoplastic material. In preferred embodiments, the thermoplastic material secures the stator to the baseplate or forms the baseplate.

11 Claims, 9 Drawing Sheets

U.S. PATENT DOCUMENTS

| | | | |
|---|---|---|---|
| 4,954,739 A | 9/1990 | Schultz et al. | |
| 5,008,572 A | 4/1991 | Marshall et al. | |
| 5,036,580 A | 8/1991 | Fox et al. | |
| 5,073,735 A | 12/1991 | Takagi | |
| 5,075,585 A | 12/1991 | Teruyama et al. | |
| 5,121,021 A | 6/1992 | Ward | |
| 5,134,327 A | 7/1992 | Sumi et al. | |
| 5,142,103 A | 8/1992 | Stine | |
| 5,147,982 A | 9/1992 | Steffen | |
| 5,206,554 A | 4/1993 | Perrot | |
| 5,241,229 A * | 8/1993 | Katakura et al. | 310/51 |
| 5,268,607 A | 12/1993 | McManus | |
| 5,325,004 A | 6/1994 | Mori et al. | |
| 5,331,483 A | 7/1994 | Muller et al. | |
| 5,334,897 A | 8/1994 | Ineson et al. | |
| 5,345,129 A | 9/1994 | Molnar | |
| 5,382,852 A | 1/1995 | Yuhi et al. | |
| 5,396,210 A | 3/1995 | Purohit et al. | |
| 5,400,218 A | 3/1995 | Val | |
| 5,414,317 A | 5/1995 | Reid et al. | |
| 5,459,190 A * | 10/1995 | Nakamura et al. | 524/443 |
| 5,461,772 A | 10/1995 | Puri | |
| 5,490,319 A | 2/1996 | Nakamura et al. | |
| 5,500,780 A | 3/1996 | Boutaghou et al. | |
| 5,506,458 A | 4/1996 | Pace et al. | |
| 5,541,787 A | 7/1996 | Jabbari et al. | |
| 5,548,458 A | 8/1996 | Pelstring et al. | |
| 5,558,445 A | 9/1996 | Chen et al. | |
| 5,579,188 A | 11/1996 | Dunfield et al. | |
| 5,587,617 A | 12/1996 | Dunfield et al. | |
| 5,598,048 A | 1/1997 | Dunfield et al. | |
| 5,610,463 A | 3/1997 | Dunfield et al. | |
| 5,619,083 A | 4/1997 | Dunfield et al. | |
| 5,619,389 A | 4/1997 | Dunfield et al. | |
| 5,621,372 A | 4/1997 | Purohit | |
| 5,633,545 A | 5/1997 | Albrecht et al. | |
| 5,659,217 A | 8/1997 | Petersen | |
| 5,664,314 A | 9/1997 | Pelstring et al. | |
| 5,666,242 A | 9/1997 | Edwards et al. | |
| 5,668,427 A | 9/1997 | Morita | |
| 5,672,927 A | 9/1997 | Viskochil | |
| 5,675,196 A | 10/1997 | Huang et al. | |
| 5,675,201 A | 10/1997 | Komura et al. | |
| 5,694,268 A | 12/1997 | Dunfield et al. | |
| 5,698,919 A | 12/1997 | Obara | |
| 5,728,600 A | 3/1998 | Saxelby, Jr. et al. | |
| 5,729,404 A | 3/1998 | Dunfield et al. | |
| 5,742,450 A | 4/1998 | Moser | |
| 5,751,085 A | 5/1998 | Hayashi | |
| 5,751,514 A | 5/1998 | Hyde et al. | |
| 5,766,535 A | 6/1998 | Ong | |
| 5,774,974 A | 7/1998 | Dunfield et al. | |
| 5,783,888 A | 7/1998 | Yamano | |
| 5,793,129 A | 8/1998 | Parsoneault et al. | |
| 5,806,169 A | 9/1998 | Trago et al. | |
| 5,814,412 A | 9/1998 | Terada et al. | |
| 5,822,846 A | 10/1998 | Moritan et al. | |
| 5,831,355 A | 11/1998 | Oku | |
| 5,850,318 A | 12/1998 | Dunfield | |
| 5,856,718 A | 1/1999 | Matsushita et al. | |
| 5,880,179 A | 3/1999 | Ito et al. | |
| 5,881,447 A | 3/1999 | Molnar | |
| 5,942,824 A * | 8/1999 | Shioya et al. | 310/90.5 |
| 5,949,613 A | 9/1999 | Moir et al. | |
| 5,955,813 A | 9/1999 | Bolte et al. | |
| 5,958,283 A | 9/1999 | Schmid et al. | |
| 5,958,466 A | 9/1999 | Ong | |
| 5,973,424 A | 10/1999 | Engelberger et al. | |
| 5,977,675 A | 11/1999 | Oelsch | |
| 5,982,057 A | 11/1999 | Imada et al. | |
| 5,986,365 A | 11/1999 | Kuwert et al. | |
| 5,990,247 A | 11/1999 | Terada et al. | |
| 6,002,185 A | 12/1999 | Nakao et al. | |
| 6,019,516 A | 2/2000 | Leuthold et al. | |
| 6,020,661 A | 2/2000 | Trago et al. | |
| 6,034,841 A | 3/2000 | Albrecht et al. | |
| 6,043,315 A | 3/2000 | Gottschalk et al. | |
| 6,043,583 A | 3/2000 | Kurosawa et al. | |
| 6,071,014 A | 6/2000 | Lee et al. | |
| 6,075,304 A | 6/2000 | Nakatsuka | |
| 6,102,636 A | 8/2000 | Geise | |
| 6,118,198 A | 9/2000 | Hollenbeck et al. | |
| 6,148,501 A | 11/2000 | Grantz et al. | |
| 6,163,952 A | 12/2000 | Takehara | |
| 6,195,226 B1 | 2/2001 | Papst | |
| 6,201,321 B1 | 3/2001 | Mosciatti et al. | |
| 6,215,219 B1 | 4/2001 | Hwang | |
| 6,291,633 B1 | 9/2001 | Nakamura | |
| 6,300,695 B1 | 10/2001 | Neal | |
| 6,362,554 B1 | 3/2002 | Neal | |
| 6,437,464 B1 | 8/2002 | Neal | |
| 6,501,616 B1 | 12/2002 | Neal | |
| 6,617,721 B1 | 9/2003 | Neal | |
| 6,753,628 B1 | 6/2004 | Neal | |
| 6,844,636 B1 | 1/2005 | Lieu et al. | |
| 6,892,439 B1 | 5/2005 | Neal et al. | |
| 6,911,166 B1 | 6/2005 | Neal | |
| 6,941,640 B1 | 9/2005 | Neal | |
| 2002/0135263 A1 | 9/2002 | Neal | |
| 2003/0071382 A1 | 4/2003 | Neal | |
| 2003/0081347 A1 | 5/2003 | Neal | |
| 2004/0034988 A1 | 2/2004 | Neal | |
| 2005/0023907 A1 | 2/2005 | Neal | |
| 2005/0082919 A1 | 4/2005 | Neal et al. | |
| 2005/0134124 A1 | 6/2005 | Lieu et al. | |
| 2005/0280172 A1 | 12/2005 | Neal | |

FOREIGN PATENT DOCUMENTS

| | | |
|---|---|---|
| BE | 891.258 | 3/1982 |
| DE | 25 39 492 A1 | 3/1977 |
| DE | 42 21 429 A1 | 6/1992 |
| EP | 0 747 943 A2 | 12/1996 |
| EP | 0 883 171 A1 | 12/1998 |
| FR | 2 647 958 | 12/1990 |
| JP | 01190256 | 7/1989 |
| JP | 01291652 | 11/1989 |
| JP | 03128645 | 5/1991 |
| JP | 05336722 | 12/1993 |
| JP | 08186953 | 7/1996 |
| JP | 10070870 | 3/1998 |
| JP | 410271719 | 10/1998 |
| JP | 11082508 | 3/1999 |
| SU | 1334297 | 8/1987 |
| SU | 1494148 | 7/1989 |
| WO | WO 92/06532 | 4/1992 |
| WO | WO 96/20501 | 7/1996 |
| WO | WO 96/33533 | 10/1996 |
| WO | WO 97/39870 | 10/1997 |
| WO | WO 01/10002 A2 | 2/2001 |

OTHER PUBLICATIONS

Product Information from Dupont Engineering Polymers entitled "Electrical/Electronic Thermoplastic Encapsulation," undated, Publ. Reorder No.: H-58633 (R, 96.7), 20 pages.

LNP Engineering Plastics, Press Release entitled "LNP Introduces First-Ever Line of Thermally Conductive Compounds," Jan. 28, 1999 (2 pages).

Buchanan Motor Works, Inc., article from the Internet entitled "Epoxy Seal—Prevents Down Time and Keeps Equipment Running Longer," Jul. 14, 1999, <http://www.bmwworks.com/VIP.htm>, 1 page.

The Epoxylite Corporation, article from the Internet entitled "Vacuum Pressure Impregnation (VPI) Systems", Nov. 19, 1999, <http://www.epoxylite.com/EpoxyliteEquipment.htm>, 3 pages.

Neeltran Inc., article from the Internet entitled "Vacuum Pressure Impregnation (VPI)", Nov. 19, 1999, <http://www.neeltran.thomasregister.com/oic/neeltran/neel9.htm> 2 pages.

Document entitled "Thermoplastic Encapsulation, Technology, Markets & Benefits," undated, but prior to Dec. 22, 1998 (37 pages).

* cited by examiner

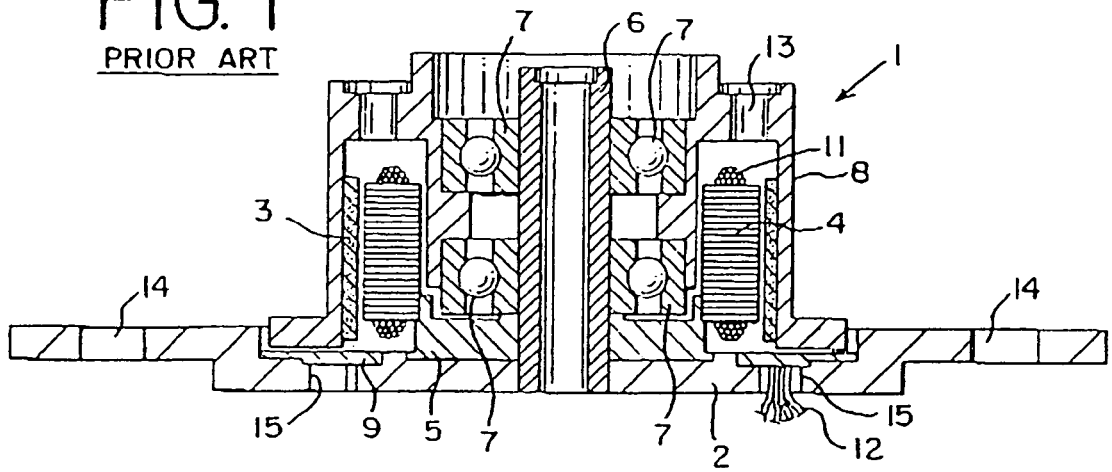
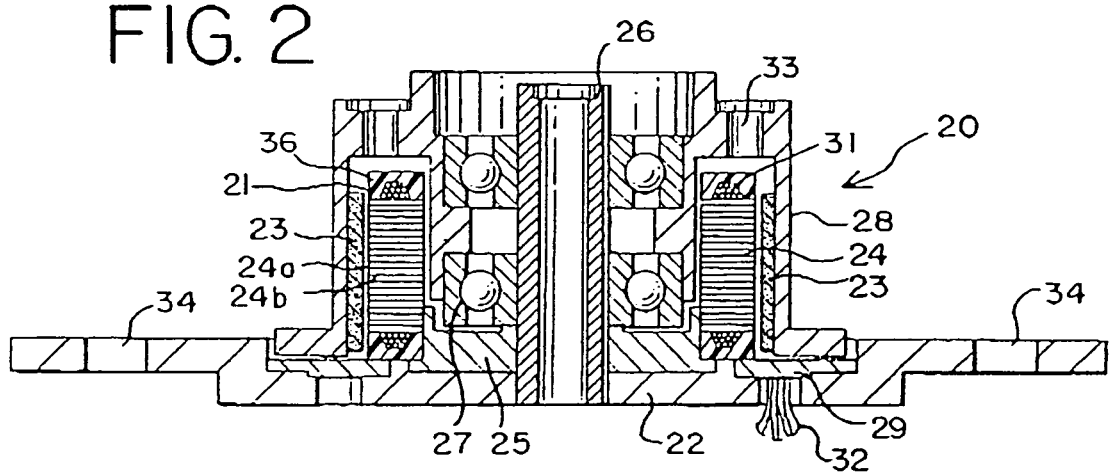
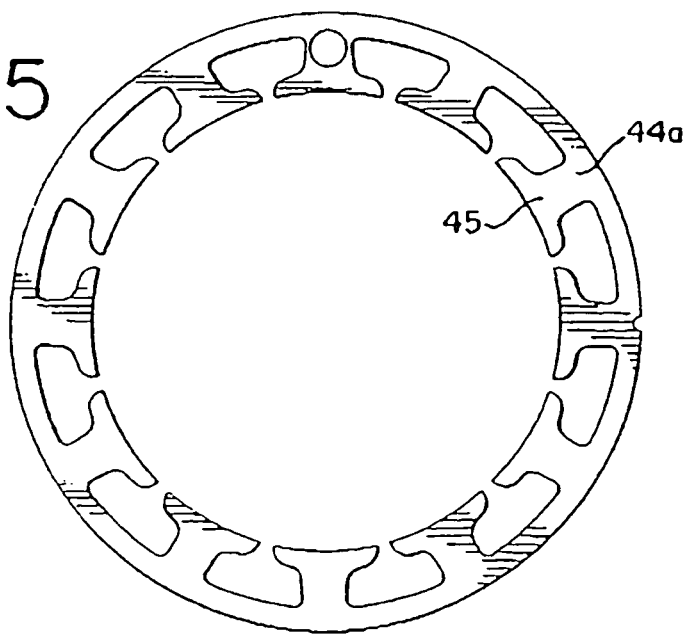

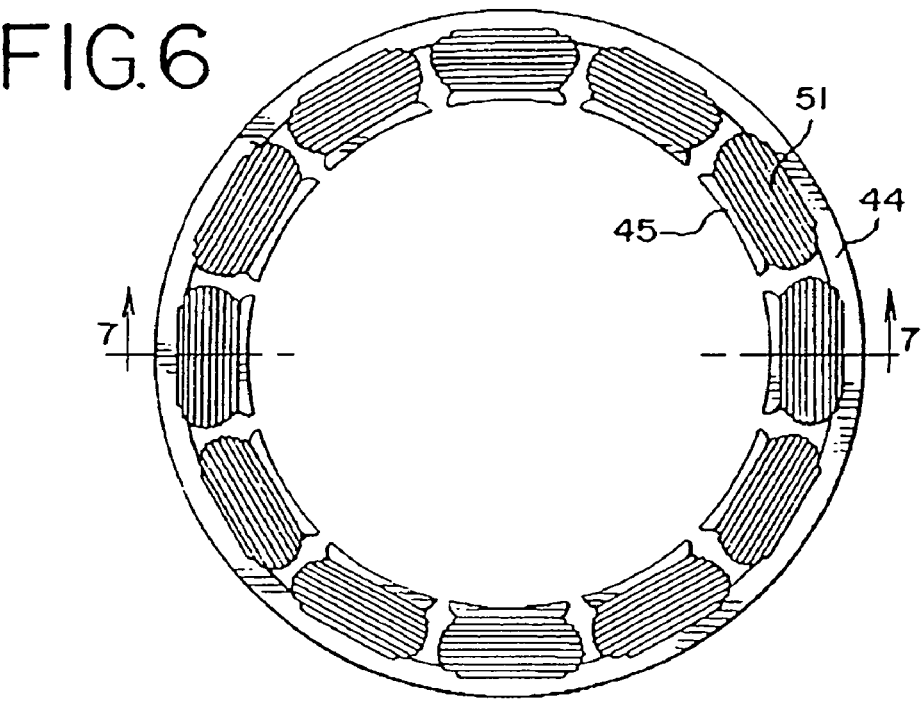
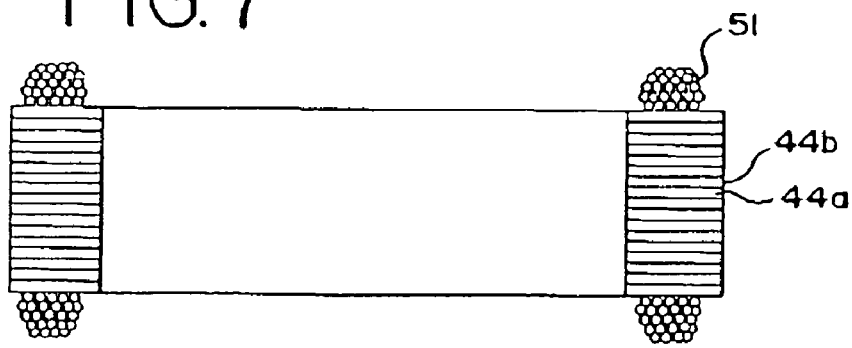
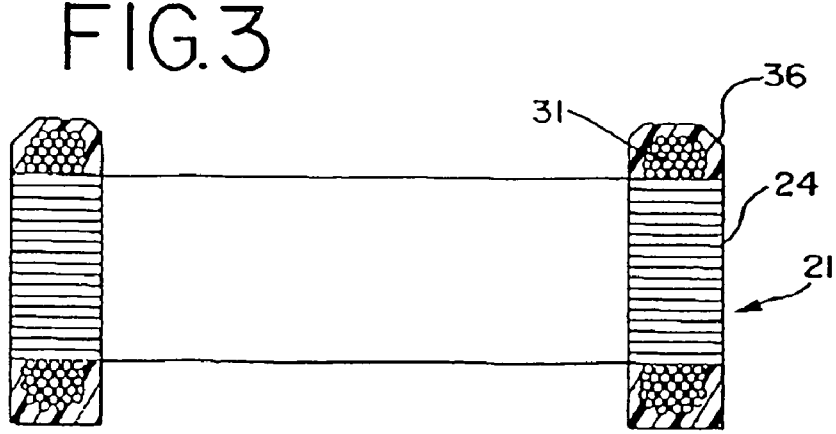

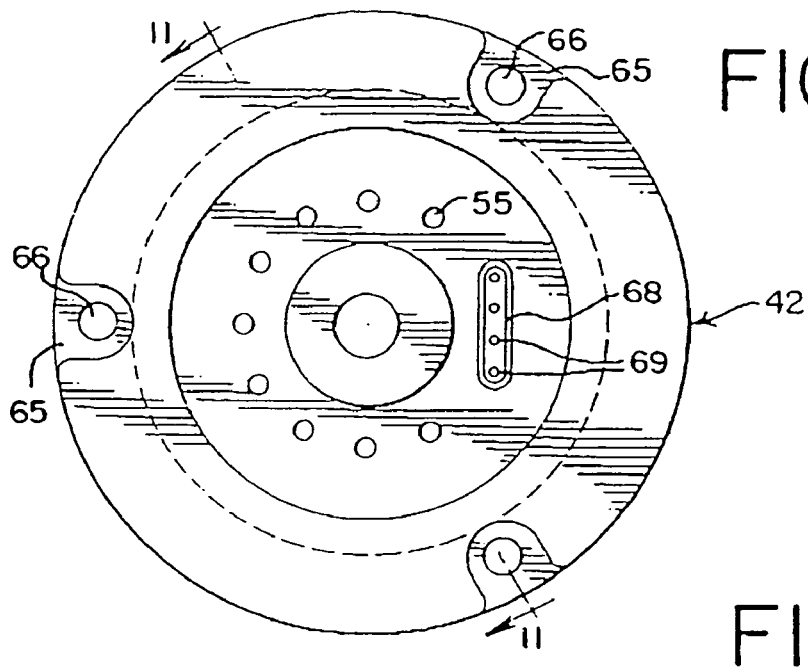
FIG. 10
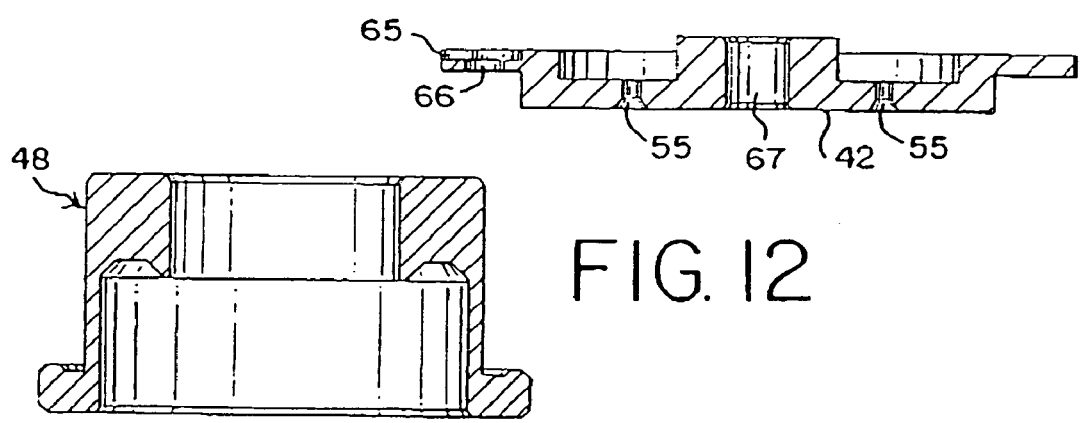
FIG. 11
FIG. 12
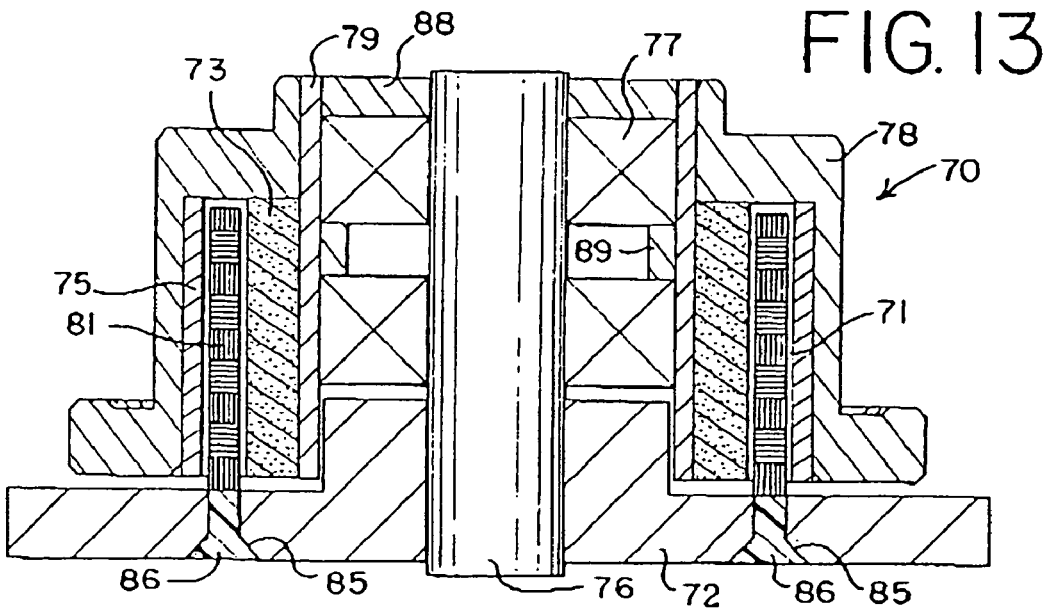
FIG. 13

MOTOR WITH ENCAPSULATED STATOR AND METHOD OF MAKING SAME

REFERENCE TO EARLIER FILED APPLICATIONS

The present application is a divisional of U.S. patent application Ser. No. 09/738,268, filed Dec. 15, 2000, now U.S. Pat. No. 6,844,636, which claims the benefit of the filing date under 35 U.S.C. §119(e) of provisional U.S. Patent Application Ser. No. 60/172,287, filed Dec. 17, 1999, and of provisional U.S. Patent Application Ser. No. 60/171,817, filed Dec. 21, 1999, all of which are hereby incorporated by reference.

FIELD OF THE INVENTION

The present invention relates to motors. More particularly the invention relates to motors with an encapsulated stator and methods of making the same, and hard drives utilizing the same.

BACKGROUND OF THE INVENTION

Computers commonly use disc drives for memory storage purposes. Disc drives include a stack of one or more magnetic discs that rotate and are accessed using a head or read-write transducer. Typically, a high-speed motor such as a spindle motor is used to rotate the discs.

An example of a conventional spindle motor 1 is shown in FIG. 1. The motor 1 includes a baseplate 2 which is usually made from machined aluminum, a stator core 4, a shaft 6, bearings 7 and a disc support member 8, also referred to as a hub. A magnet 3 is attached to the disc support member or hub 8. The hub 8 may be made of steel so that it acts as a flux return ring. The stator core 4 is secured to the baseplate 2 using a support member 5. One end of the shaft 6 is inserted into the baseplate 2 and the other end of the shaft 6 supports bearings 7, which are also attached to the hub 8. A flexible electrical cable 9 may be supported on the baseplate 2. Wires 12 from the cable exit through holes 15 in the baseplate. The flexible cable 9 is also used to seal the baseplate so that particulate material is not expelled from the motor 1. The wires 12 carry electric current to the wire windings 11 wrapped around poles formed on the core 4. Mounting holes 14 on the baseplate are used to secure the motor to the baseplate of a housing for a hard disk drive or other electrical device. The hub 8 includes holes 13 that are used to attach the media discs (not shown) to the hub 8.

Each of these parts must be fixed at predefined tolerances with respect to one another. Accuracy in these tolerances can significantly enhance motor performance.

In operation, the disc stack is placed upon the hub. The stator windings 11 are selectively energized and interact with the permanent magnet 3 to cause a defined rotation of the hub. As hub 8 rotates, the head engages in reading or writing activities baseplated upon instructions from the CPU in the computer.

Manufacturers of disc drives are constantly seeking to improve the speed with which data can be accessed. To an extent, this speed depends upon the speed of the spindle motor, as existing magneto-resistive head technology is capable of accessing data at a rate greater than the speed offered by the highest speed spindle motor currently in production. The speed of the spindle motor is dependent upon the dimensional consistency or tolerances between the various components of the motor and the rigidity of the parts. Greater dimensional consistency between components and rigidity of the components leads to a smaller gap between the stator 4 and the magnet 3, producing more force, which provides more torque and enables faster acceleration and higher rotational speeds. In the design shown, the gap between the stator 4 and magnet 3 is located near the outside diameter of the hub 8. Thus the magnet 3 is attached to the most flexible part of the hub, making the spindle vulnerable to vibration caused by misalignment of the motor. One drawback of conventional spindle motors is that a number of separate parts are required to fix motor components to one another. This can lead to stack up tolerances which reduce the overall dimensional consistency between the components. Stack up tolerances refers to the sum of the variation of all the tolerances of all the parts, as well as the overall tolerance that relates to the alignment of the parts relative to one another.

Another drawback to the conventional design is the cost of the machined baseplate 2. Unfortunately, die-casting or forging does not produce baseplates with sufficient precision. Therefore quality baseplates are made by machining the necessary surfaces and tolerances. The flexible cable 9 also adds to the cost. Steel hubs 8 are expensive and difficult to machine. Aluminum hubs 8 are less expensive, but still must be extensively machined in the bearing area. The stator 4 is a major source of acoustic noise. Also, the stator assembly is difficult to clean, so that particulates are not emitted from the motor.

In an effort to enable increased motor speed, some hard disc manufacturers have turned to the use of hydrodynamic bearings. These hydrodynamic bearings, however, have different aspect ratios from conventional bearings. An example of a different aspect ratio may be found in a cylindrical hydrodynamic bearing in which the length of the bearing is greater than it's diameter. This results in more susceptibility to problems induced by differing coefficients of thermal expansion than other metals used in existing spindle motors, making it difficult to maintain dimensional consistency over the operating temperature that the drive sees between the hydrodynamic bearings and other metal parts of the motor Hydrodynamic bearings have less stiffness than conventional ball bearings so they are more susceptible to imprecise rotation when exposed to vibrations or shock.

An important characteristic of a hard drive is the amount of information that can be stored on a disc. One method to store more information on a disc is to place data tracks more closely together. Presently this spacing between portions of information is limited due to vibrations occurring during the operation of the motor. These vibrations can be caused when the stator windings are energized, which results in vibrations of a particular frequency. These vibrations also occur from harmonic oscillations in the hub and discs during rotation, caused primarily by non-uniform size media discs.

An important factor in motor design is the lowering of the operating temperature of the motor. Increased motor temperature affects the electrical efficiency of the motor and bearing life. As temperature increases, resistive loses in wire increase, thereby reducing total motor power. Furthermore, the Arhennius equation predicts that the failure rate of an electrical device is exponentially related to its operating temperature. The frictional heat generated by bearings increases with speed. Also, as bearings get hot they expand, and the bearing cages get stressed and may deflect, causing non-uniform rotation and the resultant further heat increase, non-uniform rotation requiring greater spacing in data tracks, and reduced bearing life. One drawback with existing motor designs is their limited effective dissipation of the heat, and difficulty in incorporating heat sinks to aid in heat dissipation. In the design of the motor 1 there is a small direct path between the stator and the core, which makes it difficult to cool the stator, which reduces motor efficiency the above reasons. Also 5×11 mm bearings commonly used are not sufficiently stable nor have a life required for desired high-speed operation (10,000 rpm and above). In addition, in current motors the operating temperatures generally increase as the size of the motor is decreased.

Manufacturers have established strict requirements on the outgassing of materials that are used inside a hard disc drive. These requirements are intended to reduce the emission of materials onto the magnetic media or heads during the operation of the drive. Of primary concern are glues used to attach components together, varnish used to insulate wire, and epoxy used to protect steel laminations from oxidation.

In addition to such outgassed materials, airborne particulate in a drive may lead to head damage. Also, airborne particulates in the disc drive could interfere with signal transfer between the read/write head and the media. To reduce the effects of potential airborne particulate, hard drives are manufactured to exacting clean room standards and air filters are installed inside of the drive to reduce the contamination levels during operation.

Heads used in disc drives are susceptible to damage from electrical shorts passing through a small air gap between the media and the head surface. In order to prevent such shorts, some hard drives use a plastic or rubber ring to electrically isolate the spindle motor from the hard drive case. This rubber ring may also mechanically isolate the spindle motor from the hard drive case so that vibrations generated by the motor are not transmitted to other components in the hard drive. A drawback to this design is the requirement of an extra component.

Another example of a spindle motor is shown in U.S. Pat. No. 5,694,268 (Dunfield et al.) (incorporated herein by reference). Referring to FIGS. 7 and 8 of this patent, a stator 200 of the spindle motor is encapsulated with an overmold 209. The overmolded stator contains openings through which mounting pins 242 may be inserted for attaching the stator 200 to a baseplate. One drawback to this design is that baseplate does not receive any increased rigidity through this type of connection.

U.S. Pat. No. 5,672,972 (Viskochil) (incorporated herein by reference) also discloses a spindle motor having an overmolded stator. One drawback with the overmold used in these patents is that it has a different coefficient of linear thermal expansion ("CLTE") than the corresponding metal parts to which it is attached. Another drawback with the overmold is that it is not very effective at dissipating heat. Further, the overmolds shown in these patents are not effective in dampening some vibrations generated by energizing the stator windings.

U.S. Pat. No. 5,806,169 (Trago) (incorporated herein by reference) discloses a method of fabricating an injection molded motor assembly. However, the motor disclosed in Trago is a step motor, not a high-speed spindle motor, and would not be used in applications such as hard disc drives. Thus, a need exists for an improved spindle motor, having properties that will be especially useful in a hard disc drive, overcoming the aforementioned problems.

BRIEF SUMMARY OF THE INVENTION

A spindle motor has been invented which overcomes many of the foregoing problems. In addition, unique stator and baseplate assemblies and other components of a high-speed motor have been invented, as well as methods of manufacturing such motors. In one aspect, the invention is a spindle motor comprising: a baseplate; a shaft supported by said baseplate; a stator assembly comprising a core having poles and windings around said poles, the stator core being rigidly attached to said baseplate; injection molded thermoplastic material encapsulating said windings, and a hub supported on said shaft, said hub having a magnet connected thereto in operable proximity to the stator assembly.

In a second aspect the invention is a spindle motor comprising: a baseplate; a shaft supported by said baseplate; a stator assembly comprising a core having poles and windings around said poles, the stator assembly being spaced from the baseplate; a hub supported on said shaft, said hub having a magnet connected thereto in operable proximity to the stator assembly; and a thermoplastic material secured to the baseplate and encapsulating the stator windings, the thermoplastic material joining the stator assembly to the baseplate in the space between the stator assembly and the baseplate.

In another aspect the invention is a baseplate and stator combination comprising: a baseplate; a stator assembly comprising a core having poles, and windings around said poles; and an injection molded thermoplastic material encapsulating the windings and also locking the stator assembly to the baseplate, the baseplate and stator assembly not being in direct contact with one another but rather having a space between them filled in by the thermoplastic material.

In yet another aspect the invention is a spindle motor comprising: baseplate made of stiff thermoplastic material, having a modulus of elasticity of at least 1,000,000 psi, and a metal plate substantially encapsulated by the stiff thermoplastic material; a shaft supported by said baseplate; a stator assembly comprising a core having poles and windings around said poles; a hub supported on said shaft, said hub having a magnet connected thereto in operable proximity to the stator assembly; and a vibration dampening thermoplastic material encapsulating the stator windings, the vibration dampening thermoplastic material having a vibration dampening ratio of at least 0.05 in the range of 0–500 Hz and joining the stator assembly to the baseplate.

In another aspect the invention is a method of manufacturing a spindle motor comprising the steps of: providing a baseplate, a hub having a magnet connected thereto and a stator assembly comprising a core having poles and windings around said poles; rigidly attaching the stator core to the baseplate; injection molding a thermoplastic material to encapsulate the windings after the core is attached to the baseplate, and mounting the hub on a shaft supported on the baseplate so that the magnet on the hub is in operable proximity to the stator assembly and so that the hub can rotate with respect to the stator.

In another aspect the invention is a method of manufacturing a spindle motor comprising the steps of: providing a baseplate, a stator assembly comprising a core having poles and windings around said poles, and a hub having a magnet connected thereto; injection molding a thermoplastic material to encapsulate the windings and in between the baseplate and stator assembly so as to secure the stator assembly to the baseplate sufficiently to allow the rigidity of the core to help stiffen the baseplate, and rotatably mounting the hub on a shaft rigidly supported on the baseplate so that the magnet on the hub is in operable proximity to the stator assembly.

In another aspect the invention is a method of manufacturing a spindle motor comprising the steps of: providing a metal baseplate insert, a hub having a magnet connected thereto and a stator assembly comprising a core having poles and windings around said poles; holding the baseplate insert and stator assembly in an injection mold and injection molding a thermoplastic material so as to substantially encapsulate the baseplate insert and the windings and secure the stator assembly and baseplate insert together; and rotatably mounting the hub on a shaft rigidly supported on the combined encapsulated baseplate insert and stator assembly so that the magnet on the hub is in operable proximity to the stator assembly.

In another aspect the invention is a spindle motor comprising: a baseplate; a shaft supported by said baseplate; a coreless stator assembly comprising windings encapsulated in a thermoplastic material; and a hub rotatably supported on said shaft, said shaft having a magnet connected thereto in operable proximity to the stator assembly, the hub also including a flux return ring supported opposite the magnet so that the stator assembly is located between the flux return ring and the magnet.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

BRIEF DESCRIPTION OF SEVERAL VIEWS OF THE DRAWINGS

FIG. 1 is a cross-sectional view of a prior art high-speed motor.

FIG. 2 is a cross-sectional view of a high-speed motor in accordance with the first embodiment of the present invention.

FIG. 3 is a cross-sectional view of the encapsulated stator used in the motor of FIG. 2.

FIG. 5 is a plan view of a lamination used in the core of the stator of the high-speed motor of FIG. 4.

FIG. 6 is a plan view of the stator of the high-speed motor of FIG. 4.

FIG. 7 is a cross-sectional view of the stator shown in FIG. 6 taken along line 7—7.

FIG. 10 is a top plan view of the baseplate used in the high-speed motor of FIG. 4.

FIG. 11 is a cross-sectional view taken along line 11—11 of FIG. 10.

FIG. 12 is a cross-sectional view of the hub used in the high-speed motor of FIG. 4.

FIG. 13 is a cross-sectional view of a high-speed motor in accordance with a third embodiment of the present invention.

DETAILED DESCRIPTION OF THE DRAWINGS AND PREFERRED EMBODIMENTS OF THE INVENTION

First Embodiment

Figure 4:
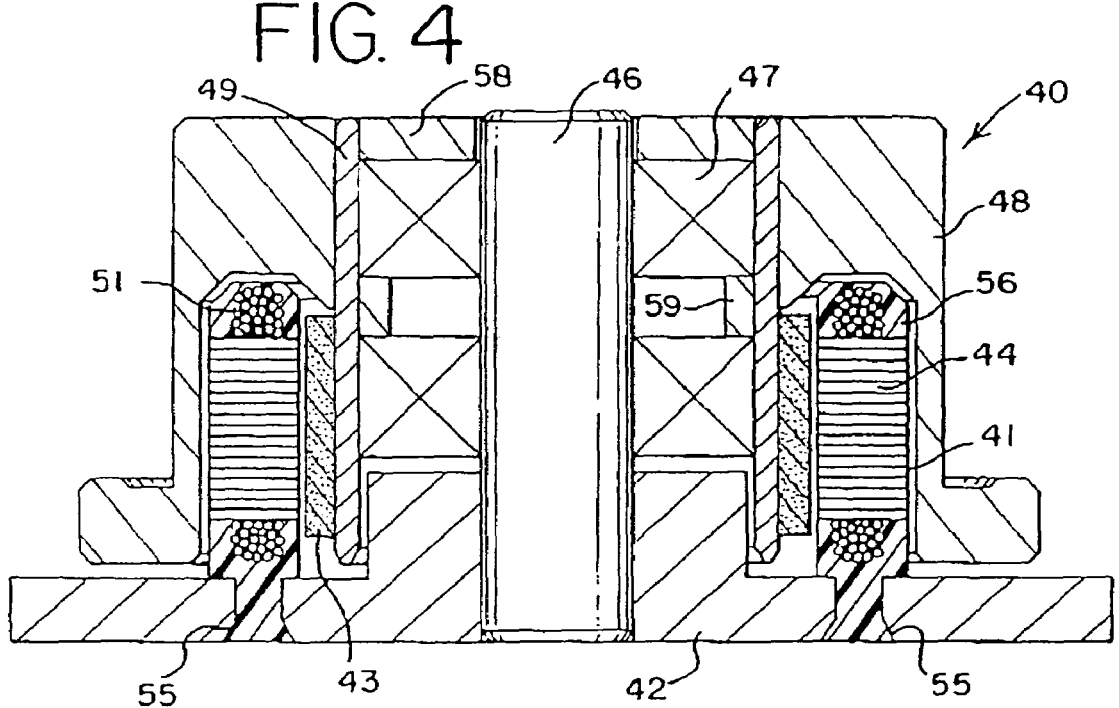
FIG. 4 is a cross-sectional view of a high-speed motor in accordance with a second embodiment of the present invention.

A first embodiment of a high-speed motor of the present invention is shown in FIGS. 2–3. By "high-speed" it is meant that the motor can operate at over 5,000 rpm. The spindle motor 20 is designed for rotating a disc or stack of discs in a computer hard disc drive. Motor 20 is formed using an encapsulation method to encapsulate the stator windings.

Referring to FIGS. 2–3, a stator assembly 21 is first constructed, using conventional steel laminations 24a, 24b, etc forming a magnetically inducible core 24 having a plurality of poles thereon, and wire windings 31 which serve as conductors. The conductors induce or otherwise create a plurality of magnetic fields in the core when electrical current is conducted through the conductors. In this embodiment, a magnetic field is induced in each of the poles. Once the windings are in place, the wire 31 is encapsulated with a thermoplastic material 36, described in more detail hereafter, and the core 24 is substantially encapsulated by the material 36 (FIG. 3).

Substantial encapsulation means that the material 36 either entirely surrounds the core 24 or surrounds almost all of it except for minor areas of the core 24 that may be exposed, such as the face of the poles. However, substantial encapsulation means that the material 36, wire 31 and core 24 are rigidly fixed together, and behave as a single component with respect to harmonic oscillation vibration.

As shown in FIG. 2, a shaft 26 is connected to the baseplate 22 and is surrounded by bearings 27. A rotor or magnet 23 is fixed to the inside of the hub 28 so as to be in operable proximity to the stator 21. The magnet 23 is preferably a permanent magnet, as described below. The baseplate 22 includes a flex cable 29 as in the motor of FIG. 1. Wires 32 may be coupled to a control circuit board (not shown) for the motor 20. Alternatively the connector may be a flexible circuit with copper pads allowing spring contact interconnection.

The baseplate 22 is generally connected to the hard drive case (not shown). Connecting members (not shown), such as screws, may be used to fix the baseplate 22 to the hard drive case, using holes 34. Alternatively, other types of mounting features such as connecting pins or legs may be formed as part of the baseplate 22. Alternatively, the baseplate of the motor may constitute the baseplate section of the hard drive housing.

The thermoplastic material 36 is preferably a thermally conductive but non-electrically conductive plastic. In addition, the plastic preferably includes ceramic filler particles that enhance the thermal conductivity of the plastic. A preferred form of plastic is polyphenyl sulfide (PPS) sold under the tradename "Konduit" by LNP. Grade OTF-212 PPS is particularly preferred. Another preferred thermoplastic material is a liquid crystal polymer sold by LNP. Examples of other suitable thermoplastic resins include, but are not limited to, thermoplastic resins such as 6,6-polyamide, 6-polyamide, 4,6-polyamide, 12,12-polyamide, 6,12-polyamide, and polyamides containing aromatic monomers, polybutylene terephthalate, polyethylene terephthalate, polyethylene napththalate, polybutylene napththalate, aromatic polyesters, liquid crystal polymers, polycyclohexane dimethylol terephthalate, copolyetheresters, polyphenylene sulfide, polyacylics, polypropylene, polyethylene, polyacetals, polymethylpentene, polyetherimides, polycarbonate, polysulfone, polyethersulfone, polyphenylene oxide, polystyrene, styrene copolymer, mixtures and graft copolymers of styrene and rubber, and glass reinforced or impact modified versions of such resins. Blends of these resins such as polyphenylene oxide and polyamide blends, and polycarbonate and polybutylene terephthalate, may also be used in this invention.

Referring to FIG. 2, the bearings 27 include an upper bearing and a lower bearing. Also, each bearing 27 has an outer surface and an inner surface. The outer surface of the bearings contacts the hub 28. The inner surfaces of the bearings 27 contact the shaft 26. The bearings are preferably annular shaped. The inner surfaces of the bearings 27 may be press fit onto the shaft 26. A glue may also be used. The outer surface of the bearings 27 may be press fit into the interior portion of the hub 28. A glue may also be used. The bearings in the embodiment shown in FIG. 2 are ball bearings. Alternatively other types of bearings, such as hydrodynamic or combinations of hydrodynamic and magnetic bearings, may be used. The bearings are typically made of stainless steel.

The shaft 26 is concentrically supported by the baseplate 22. The shaft 26 includes a top portion and a bottom portion. The top portion of the shaft 26 supports the hub 28. The bottom portion of the shaft 26 is rigidly fixed to the baseplate 22. Thus, in this embodiment, the hub 28 is freely rotatable relative to the shaft 26 and baseplate 22. The shaft 26 is preferably cylindrical shaped and may be made of stainless steel.

The hub 28 is concentrically disposed around the shaft 26. The hub 28 is spaced apart from the stator 21. The hub 28 is preferably made of steel so that the portion of the hub 28 adjacent the magnet 23 provides a flux return ring. The magnet 23 is glued to the hub 28. As shown in FIG. 2, the magnet 23 concentrically surrounds the stator 21.

The magnet 23 is preferably a sintered part and is one solid piece. The magnet 23 is placed in a magnetizer which puts a plurality of discrete North and South poles onto the magnet 23, dependant on the number of poles on the stator 21. Holes 33 in the top of the hub 28 are used to attach the magnetic media used in hard drive, just as with motor 10.

Operation of the First Embodiment

In operation, the spindle motor shown in FIGS. 2–3 is driven by supplying electrical pulses to the wires 32. These pulses are used to selectively energize the windings 31 around the stator poles. This results in a moving magnetic field. This magnetic field interacts with the magnetic field generated by the magnet 23 in a manner that causes the magnet 23 to rotate about the stator 21. As a result, the hub 28 begins to rotate about the shaft 26. The bearings 27 facilitate the rotation of the hub 28.

Discs or a disc stack (not shown) that are placed upon the hub are caused to rotate as the hub 28 rotates. A head (not shown) then reads and writes data to and from the discs.

Method of Making the First Embodiment

The encapsulated stator shown in FIGS. 2 and 3 is made in part using an encapsulation technique. This encapsulation technique involves the following steps. First, a mold is constructed to produce a part with desired geometry. The mold has two halves. The stator core with windings 31 thereon is placed within the mold and the two halves are closed. Core pins hold the stator core 24 in its correct position. Second, using solid-state process controlled injection molding, plastic is injected through one or more gates around the stator, so as to encapsulate the stator. As plastic flows in, core pins are withdrawn so that the plastic completely surrounds the windings 31 and most if not all of the core 24, thus forming the stator assembly 21 (FIG. 3).

A core support 25 is used to support the core 24 and transfer the rigidity of the encapsulated stator 21 to the baseplate 22. In other embodiments, the support 25 may simply be formed as part of the baseplate 22. The encapsulated stator 21 is press fit into the support 25.

The shaft 26 is press fit and possibly glued into the baseplate 22. Next, glue is placed on the inner and outer bearing surfaces and the bearings are press fit onto the shaft and into the interior portion of the hub 28.

After the spindle motor is assembled, it can be used to construct a hard disc drive by using the holes 34 to mount the motor to the baseplate of the hard disc drive. Thereafter, construction of the hard disc drive can follow conventional methods.

Advantages of the First Embodiment

An advantageous feature of the first embodiment is provided by the fact that the thermoplastic material 36 is preferably a monolithic body or monolithically formed using an encapsulation technique. This monolithic body provides a single structure that holds the core laminations 24a, 24b etc. and wire 31 together.

The preferred thermoplastic material 36 is a type of thermoplastic with a CLTE similar to that of the steel hub 28. This in turn facilitates optimal fits between the stator and the hub 28.

Through the use of the present embodiment, a particular plastic may be chosen for the material 36 that has properties of vibration dampening ratio and modulus of elasticity, as well as rockwell hardness, flex modulus, and elongation, that are specifically designed to counteract the vibratory frequencies generated by the motor. Thus, the disclosed spindle motor substantially reduces motor vibration. This reduced vibration allows information on a disc to be stored closer together, thereby enabling higher data density. The encapsulation also reduces acoustic emissions from the motor, making it quieter.

As discussed above, controlling heat dissipation in conventional spindle motors is difficult to achieve. A particular plastic may be chosen for encapsulating the stator 21 is designed to facilitate heat dissipation. By putting this material in intimate contact with the motor windings and then creating a solid thermal conductive pathway to the housing of the drive, overall motor temperature may be reduced.

The disclosed spindle motor also reduces the emission of materials from the motor components onto the magnetic media or heads of the disc drive. This is achieved because components such as the stator, which potentially emit such materials, are substantially encapsulated in plastic.

In addition, the disclosed spindle motor obviates the necessity of a separate plastic or rubber ring sometimes used to isolate the spindle motor from the hard drive in order to prevent shorts from being transferred to the magnetic media and ultimately the read-write heads. Because the stator 21 is preferably encapsulated in a non-electrically conductive (having a dielectric strength of at least 250 volts/mil) and injectable thermoplastic material, such a separate rubber isolating ring is unnecessary. This reduces manufacturing costs the encapsulation of the stator eliminates the need to paint the stator, which is usually done to prevent corrosion of the steel laminations Second Embodiment Referring to FIGS. 4–12, a second embodiment of the spindle motor 40 is shown. This embodiment is similar to the embodiment shown in FIGS. 2–3 and like components are labeled with similar reference numerals with an addend of 20. The primary difference between the first embodiment and the second embodiment is that in the second embodiment, the stator assembly 41 is mounted to the baseplate 42 in a different manner. Instead of the core 44 being held by a support plate, the stator 41 is secured to the baseplate by having the thermoplastic material 56 that encapsulates the windings 51 also join the stator assembly 41 to the baseplate 42. There is a space between the stator assembly 41 and the baseplate 42, and this space is filled in by the thermoplastic material 56. In this embodiment the baseplate 42 has a plurality of holes 55 through it, and the thermoplastic material 56 is secured to the baseplate 42 by filling in the holes 55. As shown in FIG. 4, the holes are enlarged on the side of the baseplate opposite to the stator assembly 41, and the thermoplastic material is thus locked to the baseplate 42 as it solidifies during the molding process.

Another significant improvement with the motor 40 is the use of a ferrule 49 to construct the hub. In this embodiment, an aluminum outer hub member 48 is attached to a steel ferrule 49. Bearings 47 are interposed between the ferrule 49 and the shaft 46. The magnet 43 is attached to the ferrule 49. A spacer 59 is attached to the inside of the ferrule 49 between the bearings 47. A seal ring or gap seal 58 is attached to the inside top portion of the ferrule 49, but not to the shaft 46. This seal ring helps to prevent any particulate generated within the motor from escaping into the hard drive.

Figure 8:
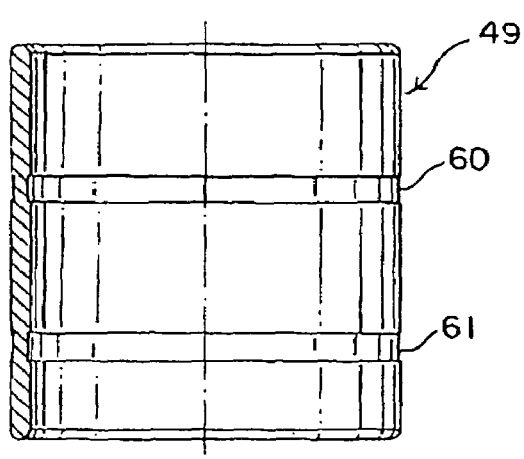
FIG. 8 is an elevational view of the ferrule used in the high-speed motor of FIG. 4.
Figure 9:
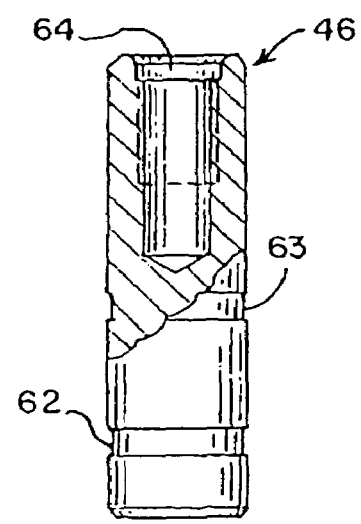
FIG. 9 is an elevational and partial cross-sectional view of the shaft used in the high-speed motor of FIG. 4.

As best seen in FIG. 8, the ferrule 49 preferably has two grooves 60 and 61 but more grooves could be used. These grooves collect and retain any excess glue when the ferrule 49 is connected to the magnet 43 and outer hub member 48. The shaft 46 has similar grooves 62 and 63 (FIG. 9), so that any excess glue present when the bearings 47 are attached will have a place to collect. Preferably an anaerobic glue is used, which cures rapidly when it is in a thin film and not exposed to oxygen. A hole 64 is preferably formed in the top of the shaft 46. The hole 64 is used to secure the top housing of the hard drive to the motor.

The baseplate 42 (FIGS. 10 and 11) has three apertures 66 formed in recessed areas 65 that are used to secure the motor 40 to a hard drive housing. Four holes 69 are formed in a recessed area 68 of the baseplate 42. These holes are for connector pins (not shown). In one preferred method of construction, leads from the windings 51 are cold welded to connector pins. The pins are smaller than the holes 69. The baseplate 42 and stator assembly are placed in an injection molding machine and held in their desired relationship, with the connector pins passing through the holes 69. Thermoplastic material 56 is injected to encapsulate the stator 41. The thermoplastic fills holes 55 as previously described. It also fills gaps between holes 69 and the connector pins. All of the holes in the baseplate are thus sealed with the thermoplastic material. The wires are encapsulated in the thermoplastic material 56, and the expense of the flex cable is thus avoided, and the process seals the baseplate at the same time the stator core and windings are encapsulated. Of course the wires may be fed through one of the holes 55 and left as pig tails for later electrical connection. In that embodiment the recessed area 68 and holes 69 would be eliminated and additional holes 55 would be used instead. The thermoplastic material 56 would then seal the hole 55 through which the wires passed.

The outer hub 48 (FIG. 12) is a fairly simple piece and can be easily machined. The use of a steel ferrule allows the hub to be fairly stiff, yet the weight is kept low because most of the hub is still aluminum. Also, in this embodiment, the magnet is located adjacent the inside diameter of the stator assembly 41. In that regard, the poles 45 are formed on the inside diameter of the stator laminations 44a, 44b, etc (FIGS. 5–6).

One of the advantages of the design of the motor of FIG. 4 is that a complex shaped hub, which is expensive and difficult to machine, is replaced by two simple and inexpensive parts, an outer hub member with a relatively simple geometry (FIG. 12), and a simple annular steel tube formed into ferrule 49. The motor 40 has a compact design, and is optimized with a built-in flux return.

Third Embodiment

FIG. 13 shows a third embodiment of the invention, using a "coreless" stator 71. In this embodiment, there are no steel laminations or core. Instead, the windings 81 are formed in a basket weave in a cylindrical shape. The wire forms poles in the cylinder by the way that wire from different windings are spaced around the cylinder. Coreless motors are known, but are difficult to manufacture because once the wire is woven and removed from a mandrel on which it is made, there is nothing to keep the cylindrical shape except the stiffness of the wire, which is usually insufficient.

Even though there are no steel laminations with poles to concentrate the magnetic flux, a coreless motor design has the benefit that there is no cogging torque as the motor spins, and also there are no core losses from eddy currents in the stator core and hysteresis losses that normally occur when a magnet passes an iron object, such as would happen if the poles in magnet 73 passed steel lamination as the hub 78 rotates.

In the motor 70, the coreless stator can be used because the wires making up the winding are encapsulated with thermoplastic material 86: Preferably holes 85 are formed in the baseplate 72, and the windings 81 and baseplate 72 are placed in an injection mold. Thermoplastic material 86 fills all the interstices of the windings 81 and the holes 85 in the baseplate. The result is an encapsulated stator that is fixed to the baseplate 72.

Another advantage of the preferred design of motor 70 is that a flux return ring 75 can be mounted on the hub 78 outside of the core and the ferrule 79 also acts as a flux return ring. Importantly, both of these rotate with the magnet 73 that is also attached to the hub 78. Thus in this design there are two flux return rings, one in front of the magnet and one behind it, but both steel rings are rotating with the magnet.

As a result, there are no hysteresis losses as the iron atoms in the steel maintain their same orientation with respect to the magnet 73 at all times. The spacer 89, seal ring 88, bearings 77 and shaft 76 serve the same function as the same parts described for motor 40.

Fourth Embodiment

Figure 14:
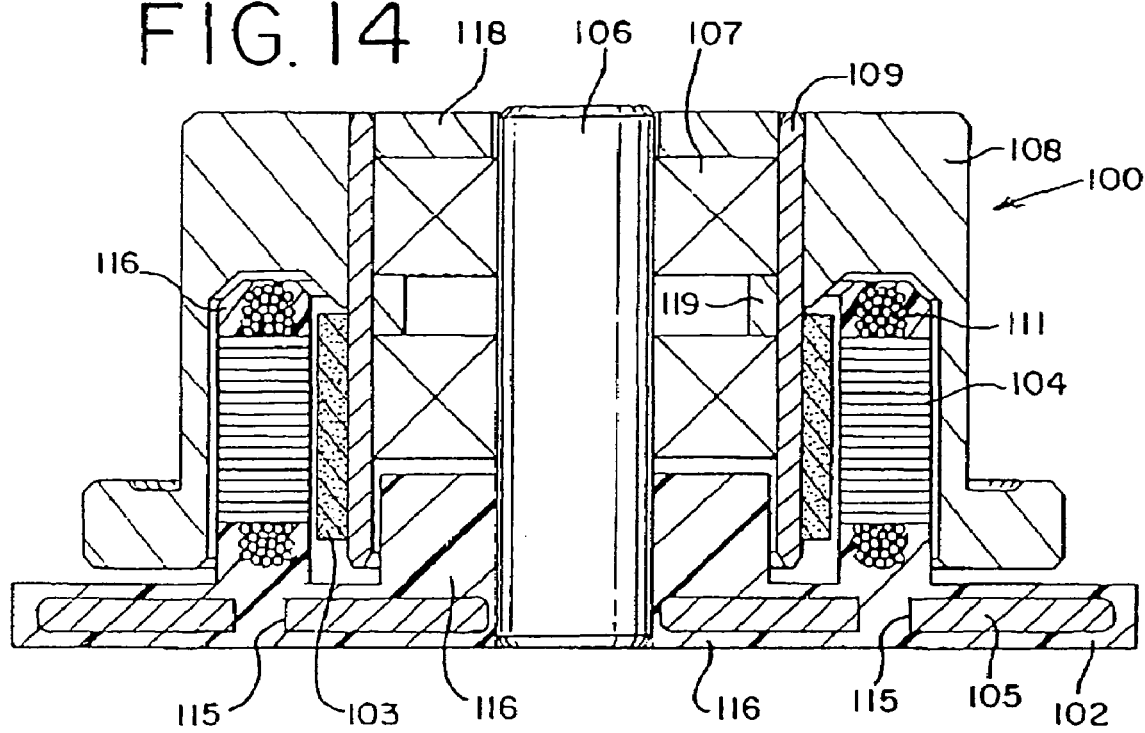
FIG. 14 is a cross-sectional view of a high-speed motor in accordance with the fourth embodiment of the present invention.

FIG. 14 shows a fourth embodiment, motor 100. Motor 100 is very similar to motor 40 of FIG. 4, and thus like components are numbered similarly but differ by an addend of 60. Thus the bearings 107, shaft 106, spacer 119, seal ring 118, core 104, windings 111, ferrule 109, magnet 103 and outer hub member 108 are just the same as their counterparts in motor 40. The main difference is that in motor 100, the baseplate 102 is made of thermoplastic material and includes a stiffening plate 105. The plate is preferably metal, and can be a simple stamped piece of steel. Preferably plate 105 has holes 115 through it. The thermoplastic material 116 not only substantially encapsulates the winding 111 and core 104, but is formed as one monolithic piece, encapsulating the plate 105 and forming the baseplate 102. While it is difficult to die cast or forge aluminum with the tolerances necessary to form baseplates 22, 42 and 72, thermoplastic materials can be injection molded to tighter tolerances. Hence, the baseplate 102 can be inexpensively formed at the same time the stator core and winding are encapsulated. The holes 115 through the plate 105 help promote a secure connection between the baseplate 102 and the stator portion.

Especially in this embodiment, but preferably in each of the motor designs, the thermoplastic that is used will be one with a high modulas of elasticity, making it stiff. Preferably the modulas of elasticity will be at least 1,000,000 psi at 25° C., more preferably at least 3,000,000 psi at 25° C., and most preferably at least 5,000,000 psi at 25° C. A preferred thermoplastic material in this regard is "Konduit" or ceramic filled liquid crystal polymer, different versions of which have been measured to have a modulas of elasticity in the range 3,000,000 psi to about 5,000,000 to 25° C.

The stiffness needed for the baseplate 102 is important, though not as critical, for the thermoplastic that surrounds the windings 111. For that material, its vibration dampening ratio is more important. It is preferred that the thermoplastic encapsulating the stator have a vibration dampening ratio of at least 0.05 in the range of 0–500 Hz, and more preferably at least 0.1. Many plastics have this type of vibration dampening ratio, but do not have the stiffness that is preferred. More preferably, the thermoplastic material will have a vibration damping ratio of at least 0.3 in the range of 0–500 Hz, and most preferably a vibration dampening ratio of at least 0.5 in the range of 0–500 Hz.

Some of the advantages of the motors 40, 70 and 100 are that the ferrule can be a precision steel tube, eliminating the complex machining of a hub. The stator is fixed to the baseplate by the thermoplastic material. This allows stiffness from the core in motors 40 and 100 to help stiffen the baseplate, and thus more rigidly support the shaft, but the vibrations from the stator are dampened from transferring to the baseplate and thus to the shaft. By fixing the stator to the baseplate using the thermoplastic material, complex machining of the baseplate can be avoided. The magnetics of the motor are optimized, reducing the volume (size) of the motor, and also reducing the vibration. If the thermoplastic material has a high thermal conductivity, there is an improved heat path to the baseplate, and thus better cooling and resulting improved motor efficiency. With the magnet on the inside of the stator, there is better stability and balance. Larger bearings (5×13 mm) can be used, also increasing stability, and allowing for high-speed operation and longer lifetimes.

The bearings are preferably preloaded when the motors are constructed, as is common practice. The core lamination (where used) are preferably made from M-15 silicon iron steel, insulated on each side, and annealed after stamping, which is also common practice. The stack of laminations is preferably epoxy coating prior to winding. The ferrule, spacer, seal ring and shaft are each preferably made from 430 stainless steel and passivated.

Besides holes 55 and 85 in the baseplate, the thermoplastic material could be caused to adhere to the baseplate in some other fashion. For example, a channel could be formed in the baseplate, or a projection on the baseplate could jut out. Also, it may be possible that a simple adhesion to a textured but otherwise flat surface would be possible.

The ferrule may be press fit in the aluminum hub to take out small imperfections in the roundness of the hub. The magnet, spacer, and bearings are then glued in place.

The windings in motors 20, 40 and 100 are preferably standard wye windings.

The increased stiffness from unitizing the stator and the baseplate increases the resonance point of the motors.

The designs as shown use fixed shafts. However, the designs could be modified so that the bearings are fixed to the baseplate and the shafts are rigidly attached to the hub and spin with the hub.

While ball bearings have been used in each of the embodiments, hydrodynamic bearings and magnetic bearings could be used.

Figure 16:
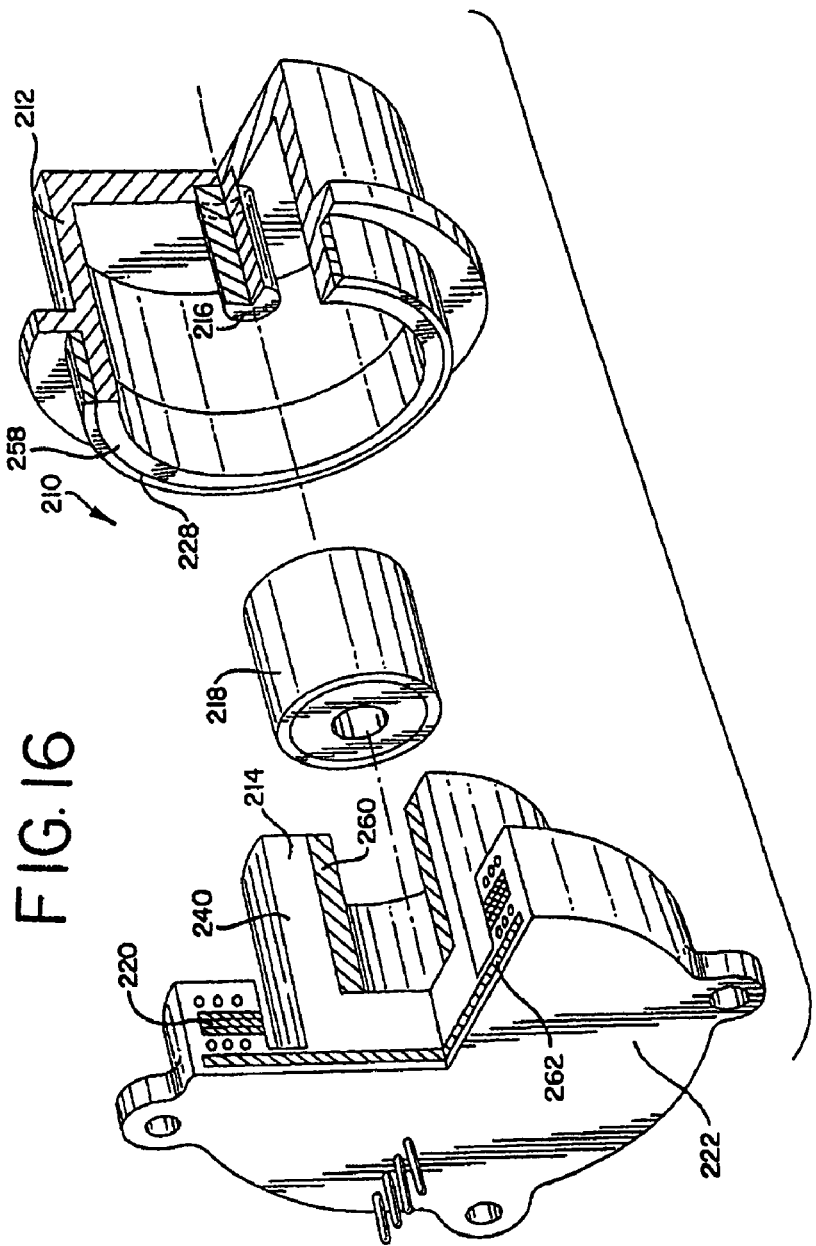
FIG. 16 is an exploded, partial cross-sectional and perspective view of a high speed motor in accordance with a fifth embodiment of the present invention.

Referring to FIG. 16 a fifth embodiment of a spindle motor 210 is shown. A monolithic body 214 is formed by an encapsulation method. In the fifth embodiment, the hub 212 is made of steel so that the flux return ring 258, which must be of a material that will propagate magnetic energy, can be made as an extension of the rest of the hub. The magnet 228 is fixed to the flux return ring 258.

The fifth embodiment demonstrates the use of inserts. In general, the term "insert" is used to describe any component other than the elements of the stator that are substantially encapsulated in the phase change material with the stator. Different inserts may be used to provide different benefits. The inserts may be used to provide structural rigidity, thermal conductivity, vibration dampening or enhanced magnetic effect. The inserts may themselves be magnetic. These second magnets can be enhancement magnets, which are directly involved with the electromechanical functioning of the motor, or can be parts of a magnetic bearing (described in more detail below). The inserts may enhance heat transfer away from the bearing and stator. The inserts may enhance dampening of motor vibration. This may reduce audible noise as well as improve motor life and allow for closer data track spacing.

In the embodiment of FIG. 16, there are two inserts. Specifically, a central insert 260 is molded within the upper portion 240 of the body 214. The central insert 260 is molded concentrically with respect to the upper portion 240, the bearing 218 and the shaft 216. A base insert 262 is molded within the base 222 portion of the body 214. The central insert 260 and the base insert 262 serve to enhance the stiffness of the body 214. These inserts also improve the overall thermal conductivity of the body 214, and thereby improve motor performance. The inserts may also be used in combination with the encapsulant to dampen unwanted vibrations or audible noise. The plastic body 214 locks the inserts into position with a high degree of strength. These inserts may be entirely overmolded by plastic or alternatively portions of these inserts may be exposed.

As seen in the drawing, when the insert 262 is a magnet, the motor comprises a core 220; at least one magnet spaced from the core; and a thermoplastic material substantially encapsulating the at least one magnet and filling in the space between the at least one magnet and the core such that the at least one magnet and the core are rigidly fixed together. It should also be noted that the motor comprises at least one conductor; at least one magnet forming at least one pole; and a thermoplastic material substantially encapsulating the at least one conductor and locating and precisely positioning the at least one conductor with respect to the at least one magnet during motor operation. Alternatively, the motor comprises at least one conductor; at least one magnet forming at least one pole; and a thermoplastic material substantially encapsulating the at least one magnet and locating and precisely positioning the at least one magnet with respect to the at least one conductor during motor operation.

Figure 17:
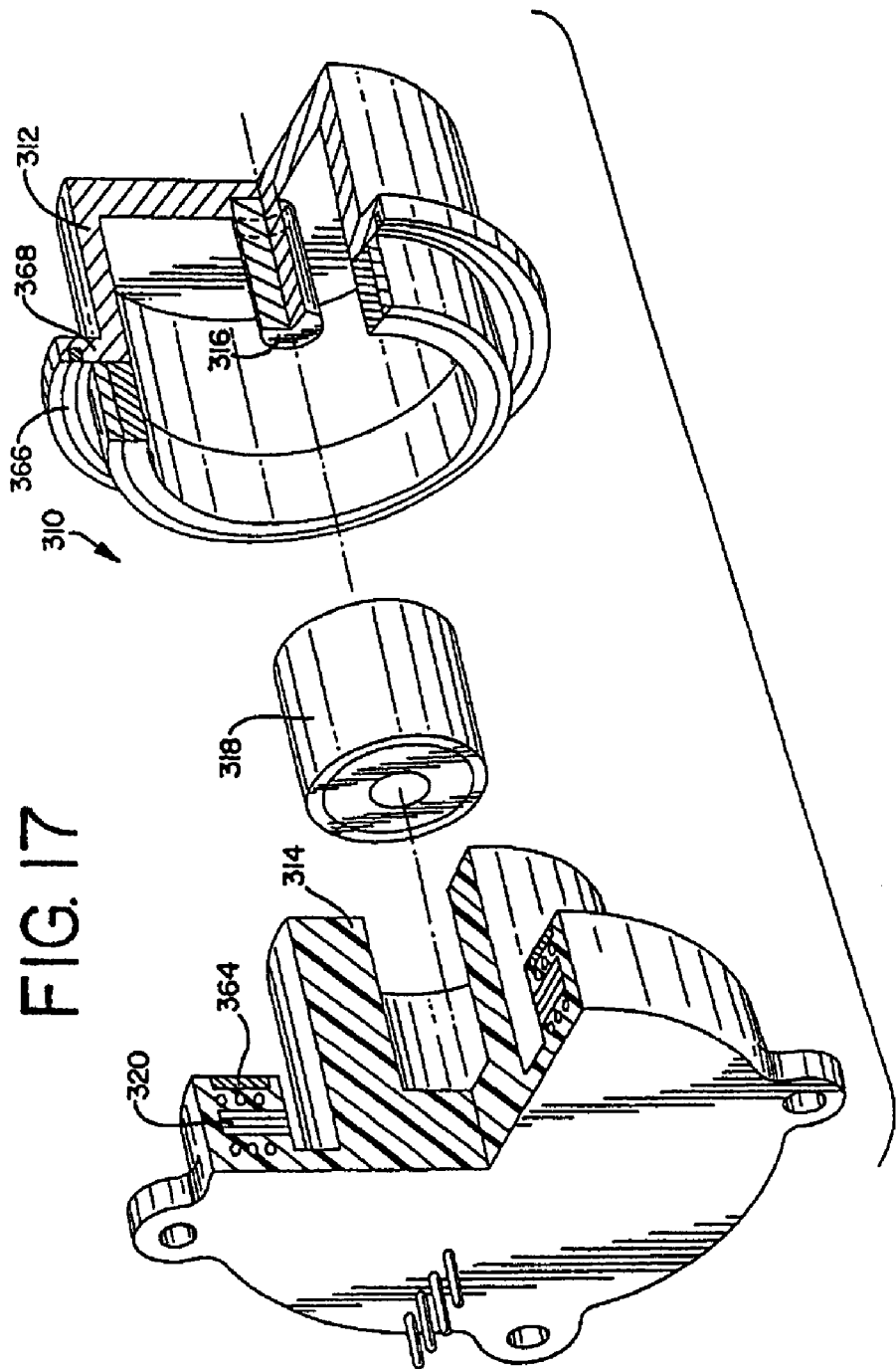
FIG. 17 is an exploded, partial cross-sectional and perspective view of a high speed motor in accordance with a sixth embodiment of the present invention.

A sixth embodiment of the spindle motor 310 is shown in FIG. 17. A monolithic body 314 is formed using an encapsulation method. The sixth embodiment includes magnetic bearings, one part of which constitutes an insert. Referring to FIG. 17 a first portion of the magnetic bearing 364 is substantially encapsulated by being insert molded into the body 314 at a position above the stator 320. A second opposing portion of the magnetic bearing 366 is attached to the hub of a flange portion 368 of the disc support member 312. The second portion of the magnetic bearing 366 is attached to the flange portion 368 by glue. The first magnetic bearing portion 364 and the second magnetic bearing portion 366 are used in conjunction with a hydrodynamic bearing to create a working gap inside the hydrodynamic bearing 318 so that there is no wear from start up conditions. The body 314 can be molded and the body and/or magnet later machined to provide precise tolerance between the first and second portions of the magnetic bearing. An advantage of the present invention is obtained by the fact that the first portion of the magnetic bearing is substantially encapsulated by the plastic of the body. The first portion may initially be completely encapsulated and the body machined to expose a surface of the magnet. Encapsulating the first portion 364 facilitates machining of the magnetic bearings and the cleaning of any magnetic debris generated by such machining.

Figure 18:
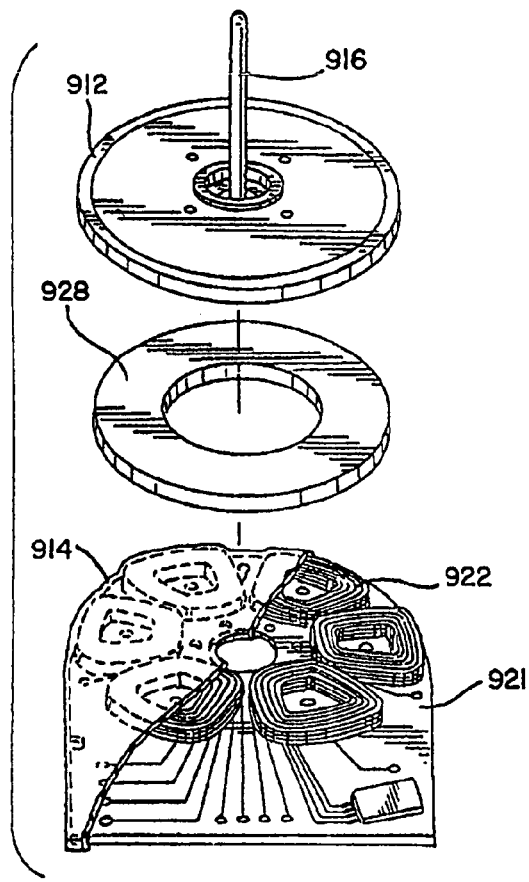
FIG. 18 is an exploded and partial cross sectional view of components used in a pancake motor, another embodiment of the invention.

Another embodiment, a pancake motor, is shown in part in FIG. 18. This embodiment uses conductors of copper wire shaped in the form of coils 922 placed upon the circuit board 921, instead of copper traces. The magnet 928 is fixed to the bottom of the hub 912, but is shown in exploded form to facilitate illustration. Thermoplastic material is used to encapsulate the circuit board and form body 914. Bearings (not shown) can be fixed to the body 914.

Figure 19:
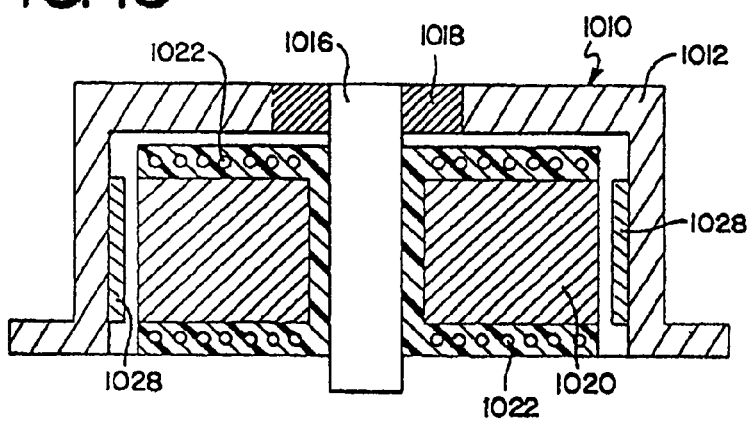
FIG. 19 is a cross-sectional view of a high speed motor in accordance with another embodiment of the invention.

Another embodiment of a motor 1010 of the present invention uses a stator and shaft that are connected together by the phase change material, as shown in FIG. 19. The windings 1022 and remainder of stator 1020 are encapsulated, and the phase change material also encapsulates a central portion of the shaft 1016. The bearing 1018 is then attached to an exposed top portion of the shaft. The bottom portion of the shaft extends below the stator so that it can be attached to the base of the hard disc drive. The shaft is thus used as the mounting structure to hold the motor 1010 to the hard disc drive housing. The hub 1012 includes a magnet 1028. One of the advantages of this embodiment is that the alignment between the shaft 1016 and stator 1020 can be set by the phase change material, and the shaft does not have to be separately glued in place.

As shown in the drawing, the motor comprises a core having poles and windings around the poles forming a pole assembly; a shaft, the shaft and pole assembly not being in direct contact with one another, but rather the shaft being spaced from the pole assembly; and a thermoplastic material secured to the shaft and substantially encapsulating the pole assembly, the thermoplastic material joining the pole assembly to the shaft in the space between the pole assembly and the shaft, filling in the space between them such that the windings, core and shaft are rigidly fixed together.

Figure 15:
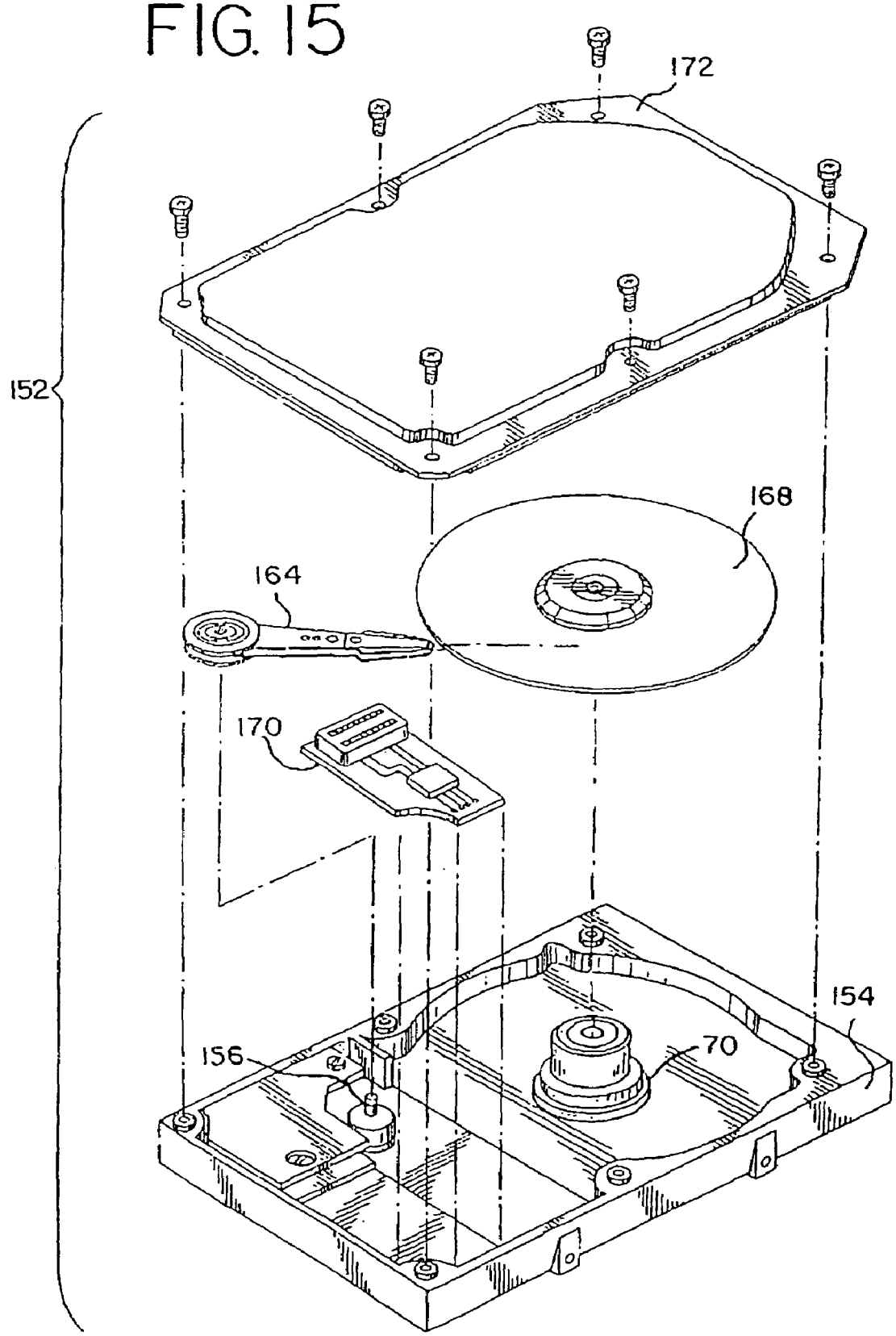
FIG. 15 is an exploded view of a hard disc drive of the present invention.

FIG. 15 shows a hard disc drive 152 that incorporates one of the motors 20, 40, 70 or 100. The baseplate of the motor is attached to the baseplate 154 of the hard disc drive 152. A shaft 156 supported by the baseplate 154 is used to support the read/write head 164 in operable proximity to one or more discs 168 supported on a hub of the motor. The hard disc drive 152 preferably includes other components, such as a circuit board 170, wiring, etc. that is commonly used in hard disc drives and therefore not further described. Of course, a cover 172 is preferably included and attached to the baseplate assembly by conventional methods. The cover and baseplate assembly cooperate to form a housing for the hard disc drive 154.

Preferably the thermoplastic material has a coefficient of linear thermal expansion (CLTE) such that the material contracts and expands at approximately the same rate as the solid parts to which it is attached. For example, the preferred thermoplastic material should have a CLTE between 70% and 130% of the CLTE of the core of the stator. When it contacts more than one solid part, the thermoplastic material should have a CLTE that is intermediate the maximum and minimum CLTE of the solid parts it is in contact with. Also, the CLTE's of the material and solid part(s) should match throughout the temperature range of the motor during its operation. An advantage of this method is that a more accurate tolerance may be achieved between the thermoplastic material and the solid parts because the CLTE of the thermoplastic material matches the CLTE of the solid parts more closely.

Most often the solid parts will be metal, and most frequently steel, copper and aluminum. The solid parts could also include ceramics. In almost all motors there will be metal bearings. It is preferred that the thermoplastic material has a CLTE approximately the same as that of the metal used to make the bearing.

Most thermoplastic materials have a relatively high CLTE. Some thermoplastic materials may have a CLTE at low temperatures that is similar to the CLTE of metal. However, at higher temperatures the CLTE does not match that of the metal. A preferred thermoplastic material will have a CLTE of less than $2 \times 10^{-5}$ in/in ° F., more preferably less than $1.5 \times 10^{-5}$ in/in ° F., throughout the expected operating temperature of the motor, and preferably throughout the range of 0–250° F. Most preferably, the CLTE will be between about $0.8 \times 10^{-5}$ in/in ° F. and about $1.2 \times 10^{-5}$ in/in ° F. throughout the range of 0–250° F. (When the measured CLTE of a material depends on the direction of measurement, the relevant CLTE for purposes of defining the present invention is the CLTE in the direction in which the CLTE is lowest.)

The CLTE of common solid parts used in a motor are as follows:

|  | 23° C. | 250° F. |  |
|---|---|---|---|
| Steel | 0.5 | 0.8 | ($\times 10^{-5}$ in/in ° F.) |
| Aluminum | 0.8 | 1.4 | |
| Ceramic | 0.3 | 0.4 | |

Of course, if the motor is designed with two or more different solids, such as steel and aluminum components, the CLTE of the thermoplastic material would preferably be one that was intermediate, the maximum CLTE and the minimum CLTE of the different solids, such as 0.65 in/in ° F. at room temperature and $1.1 \times 10^{-5}$ in/in ° F. at 250° F.

One preferred thermoplastic material, Konduit OTF-212-11, was made into a thermoplastic body and tested for its coefficient of linear thermal expansion by a standard ASTM test method. It was found to have a CLTE at 23° C. of $1.09 \times 10^{-5}$ in/in ° F. in the X direction and $1.26 \times 10^{-5}$ in/in ° F. in both the Y and Z directions. (Hence, the relevant CLTE for purposes of defining the invention is $1.09 \times 10^{-5}$ in/in ° F.)

In addition to having a desirable CLTE, the preferred thermoplastic material will also have a high thermal conductivity. A preferred thermoplastic material will have a thermal conductivity of at least 0.7 watts/meter° K using ASTM test procedure 0149 and tested at room temperature (23° C.).

Once encapsulated, the stator assembly will preferably be able to meet disc drive manufacturers' industry standards for particulate emission, requiring that when tested the parts will produce 10 or fewer particles of 0.3 micron and larger per cubic foot of air. This is primarily because machined mounting plates are eliminated and other sources of particulates (steel laminations, wound wire and wire/terminal connections) are sealed in the encapsulation.

Also, the encapsulation reduces outgassing because varnish used to insulate wire in the windings and epoxy used to prevent steel laminations from oxidizing are hermetically sealed inside the stator assembly. Also, with fewer parts there is less glue needed to hold parts together. This reduced outgassing reduces the amount of material that could affect the magnetic media or heads used in the disc drive.

Another benefit of the preferred embodiment of the invention described above is that the motor has dampened vibrations which makes it particularly well suited to make a hard disc drive. The dampened vibrations can be either in the audible frequency range, thus resulting in a disc drive with less audible noise, or in other frequencies. As mentioned earlier, the degree to which data can be packed onto a hard drive is dependent on how close the data tracks are spaced. Due to reduced vibrations resulting from aspects of the present invention, the data tracks can be more closely spaced and the hard drive still operated.

The vibrations of concern are generally produced by harmonic oscillations. The thermoplastic material can be selected so as to dampen oscillations at the harmonic frequency generated by operation of the motor, many of which are dependent on the configuration of the windings or other conductors.

There are a number of properties of the thermoplastic material that can be varied in a way that will allow the material to dampen different harmonic frequencies. This includes adding or varying the amount of glass, Kevlar, carbon or other fibers in the material; adding or varying the amount of ceramic filler in the material; changing the type of material, such as from polyphenyl sulfide to nylon or other liquid crystal polymers or aromatic polyesters, adding or grafting elastomers into a polymer used as the phase change material; and using a different molecular weight when the phase change material is a polymer. Any change that affects the flex modulus, elongation or surface hardness properties of the phase change material will also affect its vibration dampening characteristics.

In addition to the above-discussed embodiments, a similar structure and method of manufacture can be employed in spindle motors used in other types of applications. For example, these high-speed motors could be used in CD, DVD players, videocassette systems, digital cameras and in robotic servomotors.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. A motor comprising:
   a) a baseplate;
   b) a stator assembly comprising
      i) a core having poles, and
      ii) windings around said poles; and
   c) an injection molded thermoplastic material encapsulating the windings and also locking the stator assembly to the baseplate, the baseplate and stator assembly not being in direct contact with one another but rather having a space between them filled in by the thermoplastic material;
   d) wherein the baseplate is made of a thermoplastic material having a modulas of elasticity of at least 1,000,000 psi at 25° C. and the thermoplastic material of which the baseplate is made is the same material that encapsulates the windings, and the baseplate and winding encapsulation are formed as one monolithic body.

2. The motor of claim 1 wherein the baseplate is further made of a metal plate, the metal plate being substantially encapsulated in the thermoplastic material.

3. A motor comprising:
   a) a core having poles and windings around said poles forming a pole assembly;
   b) a shaft, the shaft and pole assembly not being in direct contact with one another, but rather the shaft being spaced from the pole assembly; and
   c) a thermoplastic material secured to the shaft and substantially encapsulating the pole assembly, the thermoplastic material joining the pole assembly to the shaft in the space between the pole assembly and the shaft, filling in the space between them such that the windings, core and shaft are rigidly fixed together.

4. A motor comprising:
   a) a baseplate;
   b) a stator assembly comprising
      i) a core having poles, and
      ii) windings around said poles; and
   c) an injection molded thermoplastic material encapsulating the windings and also locking the stator assembly to the baseplate, the baseplate and stator assembly not being in direct contact with one another but rather having a space between them filled in by the thermoplastic material wherein the thermoplastic used in the encapsulation has a vibratory dampening ratio of at least 0.05 in the range of 0–500 $H_z$.

5. The motor of claim 4 wherein the thermoplastic used in the encapsulation has a vibratory dampening ratio of at least 0.1 in the range of 0–500 Hz.

6. A motor comprising:
a) a baseplate;
b) a stator assembly comprising
   i) a core having poles, and
   ii) windings around said poles; and
c) an injection molded thermoplastic material encapsulating the windings and also locking the stator assembly to the baseplate, the baseplate and stator assembly not being in direct contact with one another but rather having a space between them filled in by the thermoplastic material, wherein the baseplate is made of a thermoplastic material having a modulas of elasticity of at least 1,000,000 psi at 25° C. and a metal plate, the metal plate being substantially encapsulated in the thermoplastic material.

7. A motor comprising:
a) a baseplate;
b) a stator assembly comprising
   i) a core having poles, and
   ii) windings around said poles; and
c) an injection molded thermoplastic material substantially encapsulating the windings and also locking the stator assembly to the baseplate, the baseplate and stator assembly not being in direct contact with one another but rather having a space between them, the thermoplastic material having a modulas of elasticity of at least 1,000,000 psi at 25° C.;
d) the thermoplastic material secured to the baseplate, the thermoplastic material joining the stator assembly to the baseplate in the space between the stator assembly and the baseplate, filling in the space between them such that the windings, core and baseplate are rigidly fixed together.

8. The motor of claim 7 wherein the thermoplastic material has a modulas of elasticity of at least 2,000,000 psi at 25° C.

9. A motor comprising:
a) a core;
b) at least one magnet spaced from the core; and
c) a thermoplastic material substantially encapsulating the at least one magnet and filling in the space between the at least one magnet and the core such that the at least one magnet and the core are rigidly fixed together.

10. A motor comprising:
a) at least one conductor;
b) at least one magnet forming at least one pole; and
c) a thermoplastic material substantially encapsulating the at least one conductor and locating and precisely positioning the at least one conductor with respect to the at least one magnet during motor operation.

11. A motor comprising:
a) at least one conductor;
b) at least one magnet forming at least one pole; and
c) a thermoplastic material substantially encapsulating the at least one magnet and locating and precisely positioning the at least one magnet with respect to the at least one conductor during motor operation.

* * * * *